2 Sheets--Sheet 1.

W. BURDON.

Steam Vacuum-Pumps.

No. 5,640. Reissued Nov. 4, 1873.

*Witnesses.*
Chandler Hall.
J A Coley

*Inventor.*
Wm Burdon

AM. PHOTO-LITHOGRAPHIC Co. N.Y. (OSBORNE'S PROCESS)

2 Sheets--Sheet 2.

W. BURDON.

Steam Vacuum-Pumps.

No. 5,640. Reissued Nov. 4, 1873.

Witnesses.
Chandler Hall.
J. Aug. Coley

Inventor.
Wm Burdon

AM. PHOTO-LITHOGRAPHIC Co. N.Y. (OSBORNE'S PROCESS)

UNITED STATES PATENT OFFICE.

WILLIAM BURDON, OF BROOKLYN, NEW YORK.

IMPROVEMENT IN STEAM VACUUM-PUMPS.

Specification forming part of Letters Patent No. 135,201, dated January 28, 1873; reissue No. 5,640, dated November 4, 1873; application filed September 13, 1873.

*To all whom it may concern:*

Be it known that I, WILLIAM BURDON, of the city of Brooklyn, in the county of Kings and State of New York, have invented certain new and useful Improvements in Steam Vacuum-Pumps; and I do hereby declare that the following is a full, clear, and exact description thereof, that will enable others skilled in the art to which it appertains to make and use the same, reference being had to the accompanying drawings and to the letters of reference marked thereon, which form a part of this specification.

This invention consists in a steam-engine, a steam vacuum-pump, and a water-wheel, when so combined that the exhaust steam from the steam-engine is used to operate the pumps, and the latter supplies water to the wheel to drive it, whereby the exhaust steam of the engine is utilized, and, by means of the aforesaid pump and wheel, made to form an auxiliary to the engine, and a very economical and effective motive power is produced; further, it also consists in arranging the pumps and their operating mechanism so that the engine can be run rapidly without hindering the action of the pumps.

Figure 1:
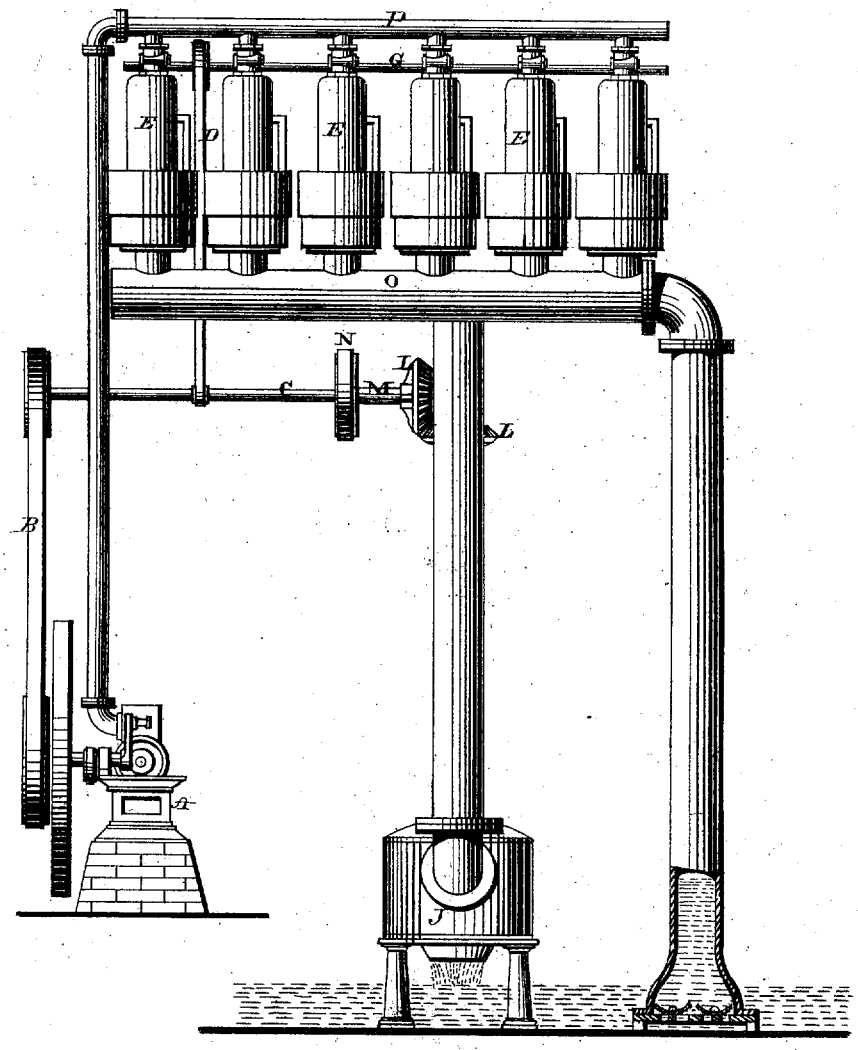
Figure 2:
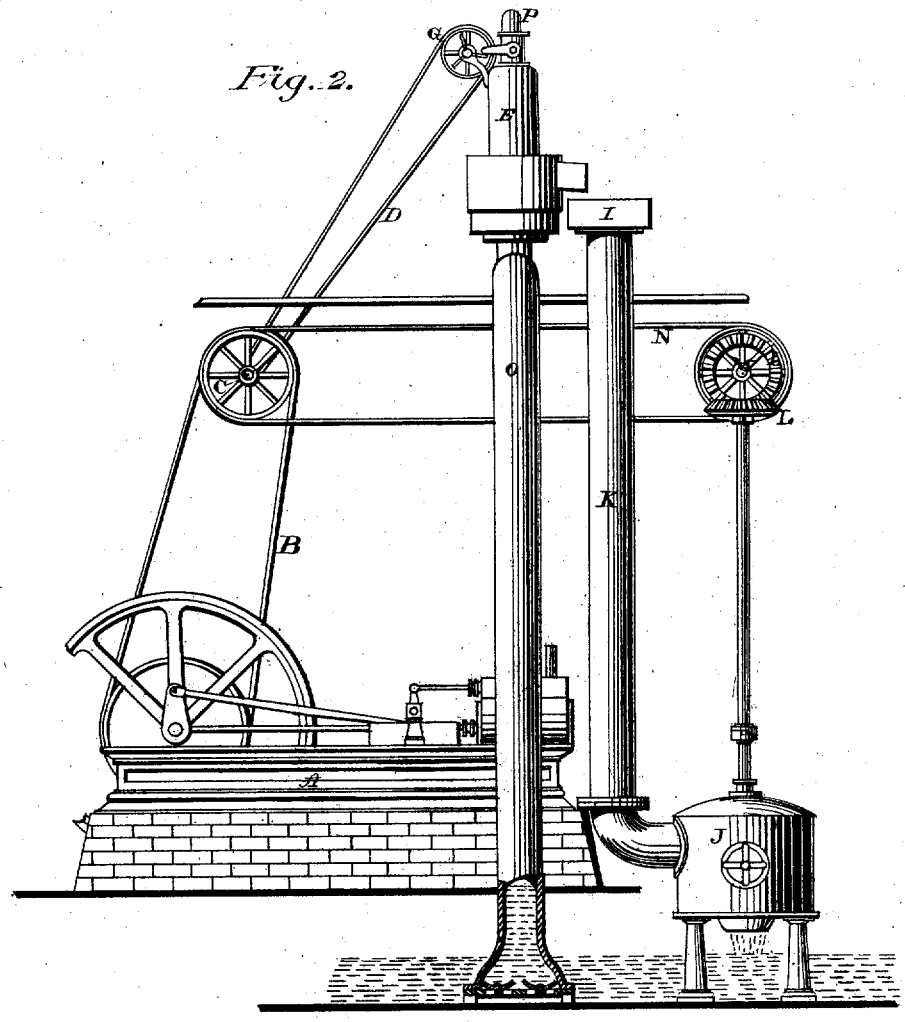

In the accompanying drawing, Figure 1 is a view looking endwise at the engine and sidewise at the pumps and water-wheel, and Fig. 2 is a view taken at right angles to the former.

Similar letters of reference indicate corresponding parts in both figures.

A is the steam-engine, which may be of any known kind. Its power is communicated, by a belt, B, and suitable pulleys, to a counter-shaft, C. Another belt, D, connects this counter-shaft C with the valve-operating shaft G of the pumps E E, which are arranged some distance above the engine—on an upper floor of a building, for instance. They are the same as described in a previous application filed by me for Letters Patent, consisting of a series of vacuum-vessels whose steam-inlet valves are shifted by tappets on the shaft G, before mentioned, to admit steam to them one after the other in regular succession, so that one of the pumps is always in full operation, and a steady stream is always kept up. Steam is conducted to them from the engine A by a pipe, P, which extends along the top of the whole series.

The water to be pumped is situated in the lower floor of the building, and is conveyed to the pumps through a pipe, O, which, like the steam-pipe just mentioned, extends along the whole series. All these pumps discharge into curbs or discharge-boxes, with which they are provided, and these all deliver into an adjacent trough, I, from which the water is conveyed to the water-wheel J by a single pipe, K.

The water-wheel represented is one of the class known as turbines. The water enters its case or shell at one side, and is discharged through the bottom. The shaft of this wheel is geared by miter-wheels L L with a counter-shaft, M, from which power is communicated by a belt, N, to the counter-shaft C, to which the power of the engine is also communicated, as I previously mentioned.

Steam is conducted, in the ordinary manner, from a steam-generator to the engine A, and when exhausted from the latter is conveyed to the pumps E E. By being condensed in the pumps one after another, it causes water to be forced up into them, and then, by being afterward admitted, it destroys the vacuums and permits the pumps to discharge successively. The water delivered from the pumps is conducted to the wheel J, and by operating it forms an auxiliary to the engine.

It is evident that, if I utilize exhaust steam from an engine to the production of additional power, I have a clear gain, because I utilize that which ordinarily is considered of no account.

My only reason for arranging the pumps in an elevated position is, that I may obtain a good head of water for driving the water-wheel.

The same water may be pumped up over and over again when desirable.

The chambers of the pump will not empty and fill more than twenty-five or thirty times a minute; they consequently cannot be used with an engine running even at a moderate speed—for instance, seventy-five revolutions a minute, which will cause one hundred and fifty discharges of steam per minute. To obviate this difficulty it was found necessary to reduce the speed of the valve-operating shaft G, which was accomplished by means of the system of belts and wheels shown in the drawing at B, C, D, and G, the number of the revolutions of the shaft being regulated in accordance with the capacity of the pump-chambers to fill and discharge.

What I claim as my invention is—

1. A steam-engine, a steam vacuum-pump, and a water-wheel, so combined that the exhaust steam from the engine is used to operate the pump, and the latter is made to supply the water-wheel with water, whereby the exhaust steam is converted into an auxiliary to the engine, substantially as and for the purpose set forth.

2. Two or more steam vacuum-pumps attached to the exhaust-pipe of a steam-engine, said pumps having steam-inlet valves, in combination with a valve-operating shaft, and with mechanism for reducing the speed of said shaft, the various parts being so arranged that one vacuum-chamber will always be open to receive the exhaust steam from the engine, substantially as described.

In testimony that I claim the foregoing I have hereunto set my hand this 4th day of September, 1873.

WM. BURDON.

Witnesses:
CHANDLER HALL,
JOEL SMITH.